(12) United States Patent
Vivekraja et al.

(10) Patent No.: US 10,929,063 B1
(45) Date of Patent: Feb. 23, 2021

(54) ASSISTED INDIRECT MEMORY ADDRESSING

(71) Applicant: Amazon Technologies, Inc., Seattle, WA (US)

(72) Inventors: Vignesh Vivekraja, Santa Clara, CA (US); Yu Zhou, Pflugerville, TX (US); Ron Diamant, Albany, CA (US); Randy Renfu Huang, Morgan Hill, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 16/368,538

(22) Filed: Mar. 28, 2019

(51) Int. Cl.
  *G06F 3/06* (2006.01)
  *G06F 12/06* (2006.01)
  *G06F 13/28* (2006.01)

(52) U.S. Cl.
  CPC .......... *G06F 3/0659* (2013.01); *G06F 3/0604* (2013.01); *G06F 3/065* (2013.01); *G06F 12/0646* (2013.01); *G06F 13/28* (2013.01); *G06F 2212/1008* (2013.01)

(58) Field of Classification Search
  CPC ...... G06F 3/0659; G06F 3/065; G06F 3/0604; G06F 13/28; G06F 12/0646; G06F 2212/1008
  See application file for complete search history.

(56) References Cited

U.S. PATENT DOCUMENTS

| | | | | |
|---|---|---|---|---|
| 6,122,669 A | * | 9/2000 | Crayford | G06F 13/1605 709/232 |
| 7,139,890 B2 | * | 11/2006 | Moran | G06F 12/1483 711/163 |
| 2016/0352815 A1 | * | 12/2016 | Mozolewski | G06F 9/5083 |

* cited by examiner

*Primary Examiner* — Hiep T Nguyen
(74) *Attorney, Agent, or Firm* — Kilpatrick Townsend & Stockton LLP

(57) ABSTRACT

Systems and methods for assisted indirect memory addressing are provided. Some computing systems move data between levels of a hierarchical memory system. To accommodate data movement for computing systems that do not natively support indirect addressing between levels of the memory hierarchy, a direct memory access (DMA) engine is used to fetch data. The DMA engine executes a first set of memory instructions that modify a second set of memory instructions to fetch data stored at one level of the memory hierarchy from dynamically computed indirect addresses stored in memory locations at another level of the memory hierarchy.

21 Claims, 8 Drawing Sheets

ASSISTED INDIRECT MEMORY ADDRESSING

BACKGROUND

Integrated circuit devices, such as processors, accelerators, and others, can include multiple execution engines. The data on which the execution engines operate can be retrieved from a memory of the integrated circuit device. Different memory addressing schemes can be used to retrieve data from the memory. Indirect memory addressing is a scheme in which an address specifies which memory location contains the address of a required operand. The address of the operand is held in an intermediate location so that the address is first 'looked-up' and then used to locate the operand itself. Indirect memory addressing is beneficial for accelerating machine learning operators, e.g. embedding table lookups in language translation and natural language processing applications.

BRIEF DESCRIPTION OF THE DRAWINGS

Various embodiments in accordance with the present disclosure will be described with reference to the drawings, in which.

DETAILED DESCRIPTION

Figure 1:
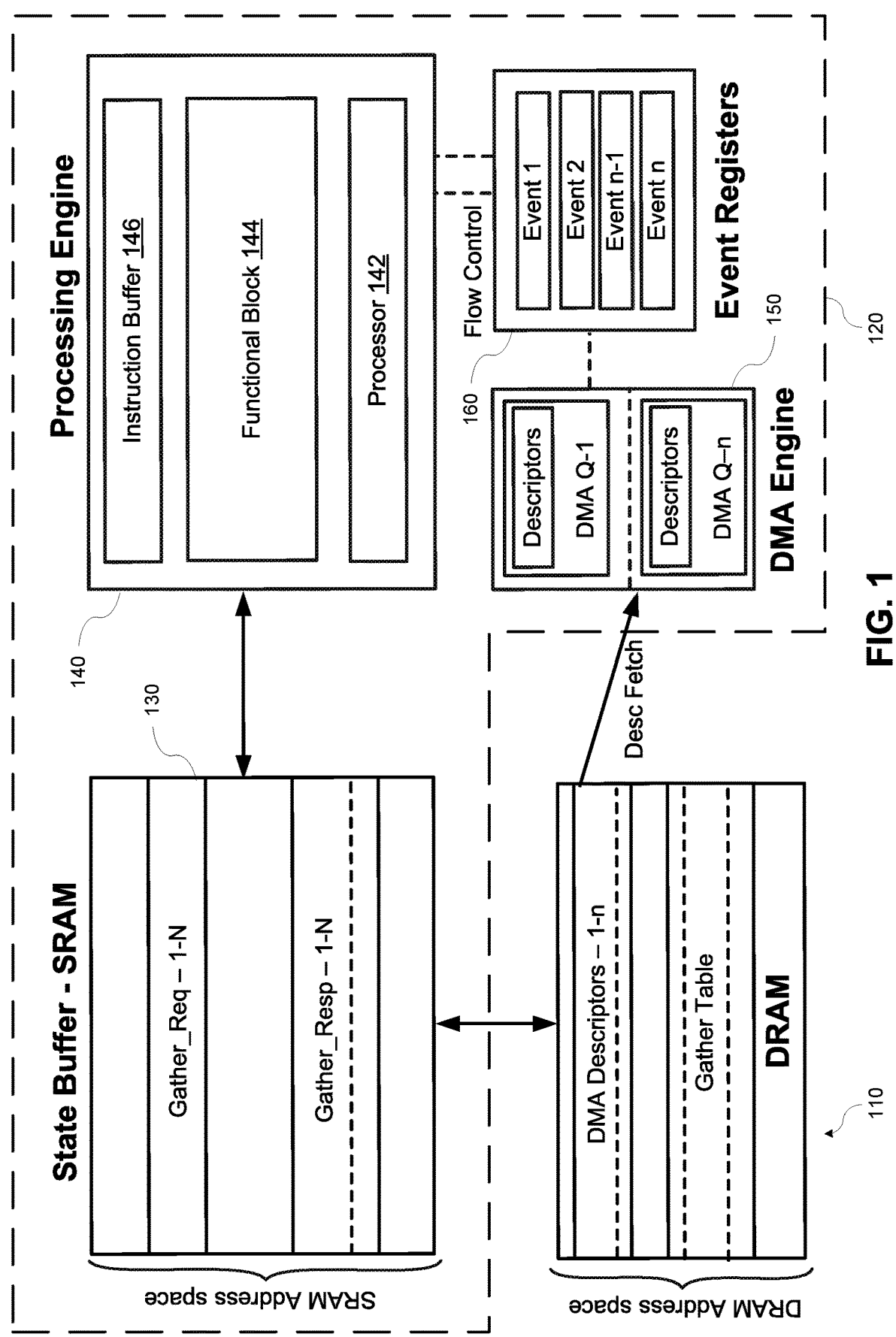
FIG. 1 is a block diagram of an integrated circuit device illustrating an example hardware configuration for implementing the process for indirect addressing of a data table according to aspects of the present disclosure.

Embedded table lookup operations are used by integrated circuit devices (e.g., neural network processors) for executing applications such as language translation and natural language processing. Indirect memory addressing is used when performing embedded table lookup operations. However, the integrated circuit device hardware may not natively support indirect address lookups from the memory.

Indirect memory addressing operations for table lookups, for example, the gather_nd operator, can be performed by an accelerator together with the main central processing unit (CPU) of the host system. The gather_nd operator is used to gather fixed slices from a constant N-dimensional tensor. The fixed slices are specified by real-time computed indices for a lookup table. A set of indices may be generated by an execution engine of the accelerator, but the execution engine may lack the capability of then using the set of indices to extract a slice described by the indices (e.g., the gather_nd operation). The accelerator may be designed as a low-cost device, and thus may lack the indirect addressing that would be needed to perform an operation such as gather_nd. Instead, the host CPU would have to intervene to perform the operation. The execution engine may be unable to perform useful work while the table lookup is being performed.

According to certain aspects of the disclosure, a method for using a direct memory access (DMA) to fetch data from dynamically generated indirect addresses is provided. The method may be used to implement embedded table lookup operators, for example machine learning operators including the gather_nd operator, to accelerate applications such as language translation and natural language processing applications.

At compile time, a compiler may generate a first set of memory instructions operable to read data at a memory address of a data table stored in host memory and copy the data to a target location in an integrated circuit device. The compiler may also generate a second set of memory instructions operable to overwrite a portion of the memory address of the data table indicated in each of the first set of memory instructions. The first set of memory instructions and the second set of memory instructions may be stored in the host memory at locations determined by the compiler. A processing engine may perform computations and determine locations in the data table that contain data needed for further processing. The processing engine may determine offsets from a base memory address of the data table where the data can be found. The processing engine may store the address offsets in locations of a memory in the integrated circuit device determined by the compiler at compile time.

To access the data in the data table in host memory, the processing engine may cause the second set of memory instructions to be executed, thereby overwriting a portion of the memory address of the data table indicated in each of the first set of memory instructions with an offset to a location where the needed data can be found. The first set of memory instructions may then be executed to copy the data from the data table in the host memory to the memory in the integrated circuit device. Thus, the process provides a method of indirect address lookups from the memory hierarchy.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 is a block diagram of an integrated circuit device illustrating an example hardware configuration for implementing the process for indirect addressing of a data table according to aspects of the present disclosure. Referring to FIG. 1, the example hardware configuration may include a memory 110 and an integrated circuit device 120. The memory 110 may be, for example, dynamic random access memory (DRAM) or another type of memory. In some implementations, the memory 110 may be a host system memory. In some implementations, the memory 110 may be external to and communicatively coupled to the integrated circuit device 120. The integrated circuit device 120 may be, for example, a neural network processor or another integrated circuit device.

The integrated circuit device 120 may include a state buffer 130 or other on-chip memory, one or more processing engines 140, one or more direct memory access (DMA) engines 150 and associated DMA queues, and one or more event registers 160. The processing engines 140 and DMA engines 150 may be referred to herein as execution engines. In various implementations, the processing engines 140 may include a processor 142, a functional block 144, and an instruction buffer 146. The functional block 144 may execute the functions associated with the particular processing engine. The instruction buffer 146 may operate as a first-in, first-out (FIFO) type of memory. Each address in the instruction buffer 146 may be directly addressable.

The state buffer 130 or other on-chip memory may include a static random access memory (SRAM) or any suitable memory, and may be configured to provide caching of data used for computations by the functional block 144. The data cached at the state buffer 130 may include, for example, but not limited to, input data sets and weights acquired from the memory 110, as well as intermediate outputs of computations at the functional block 144. The DMA engine 150 may be configured to perform DMA operations to transfer data between the integrated circuit device 120 and the host system memory. The DMA queues may contain instructions, also referred to herein as descriptors, executed by the DMA engine 150 to perform memory transactions. A plurality of DMA queues may be associated with the DMA engine 150.

The event registers 160 are a type of memory location in the integrated circuit device that can be written to by the execution units, for example, but not limited to, the processing engine 140, the DMA engine 150, etc. In some examples, each bit in a physical register can represent an individual event. In some examples, each physical register represents an individual event. The integrated circuit device may have a fixed or limited number of event registers. For example, the integrated circuit device may have registers representing a maximum of 256 (or some other number) of events.

Figure 2:
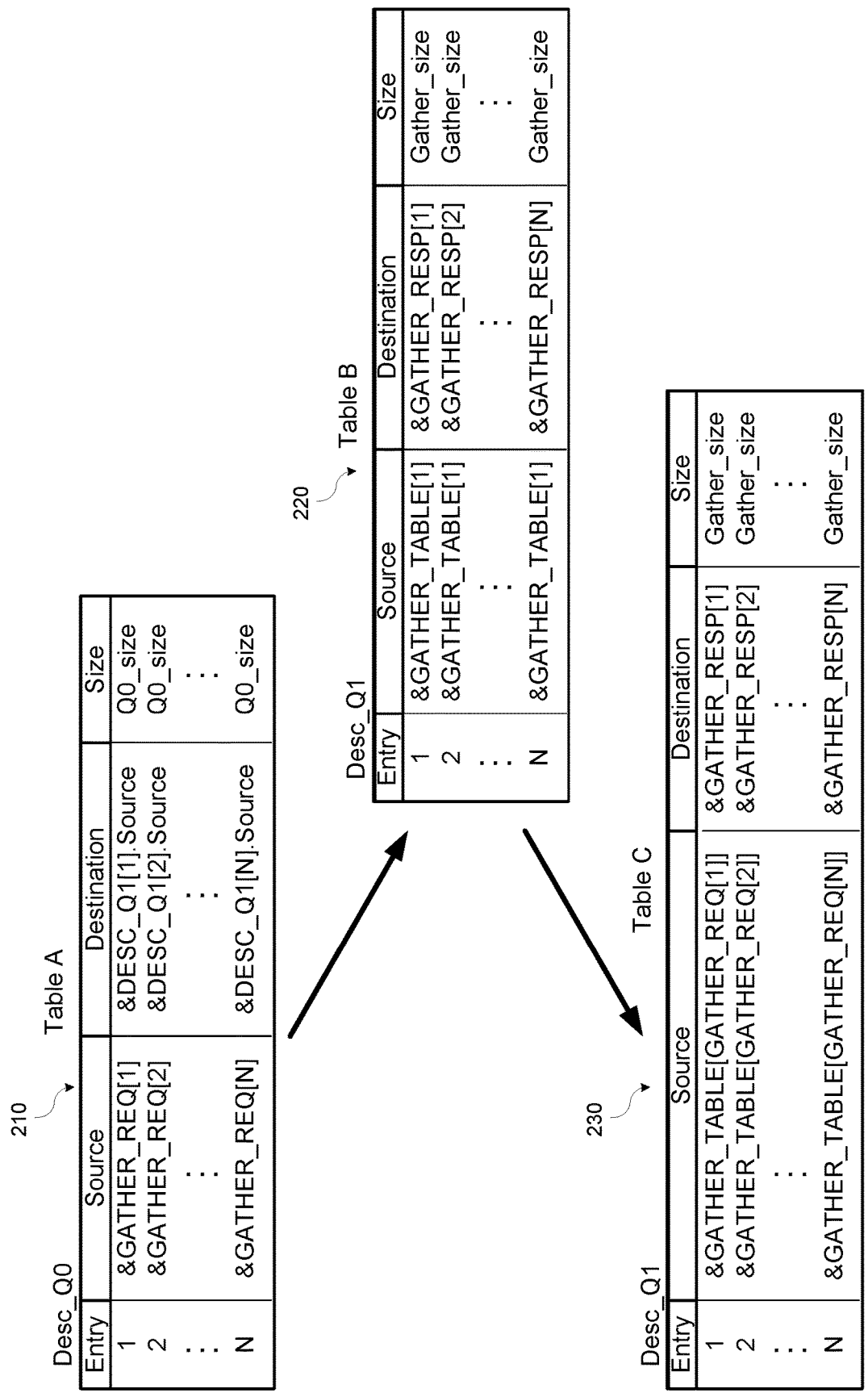
FIG. 2 is a diagram illustrating tables containing example descriptors for DMA queues according to various aspects of the present disclosure.

FIG. 2 is a diagram illustrating tables containing example descriptors for DMA queues according to various aspects of the present disclosure. DMA descriptors are instructions to cause a DMA engine to move data from a first location to a second location. DMA descriptors may also be referred to herein as memory instructions. Referring to FIG. 2, Table A 210 may contain descriptors for a first DMA queue (Desc_Q0) and Table B 220 may contain descriptors for a second DMA queue (Desc_Q1). In some implementations, the first DMA queue and the second DMA queue may be serialized in the same DMA engine. In some implementations, the first DMA queue and the second DMA queue may be placed in separate hardware DMA engines. Addresses and descriptors for Table A 210 and Table B 220 may be generated and stored in host system memory (i.e., DRAM) by the compiler at compile time.

Compilers, in general, are software programs that translate program code written in a human-readable language into a format (e.g., machine instructions) that can be read and processed by an integrated circuit device. For example, the integrated circuit device 120 may be a neural network accelerator and the compiler may compile a neural network description into instructions to be executed by the integrated circuit device 120.

The DMA descriptors may include a source of data to be copied, a destination for the data to be copied to, and an amount or size of the data to be copied. Referring to Table A 210, the descriptors for the first DMA queue (i.e., Desc_Q0) may include instructions to copy data from addresses (e.g., &GATHER_REQ[1]) in the state buffer (e.g. the state buffer 130 or other on-chip memory) of the integrated circuit device 120 to addresses (e.g., &DESC_Q[1].Source) in DRAM (e.g. DRAM 110) containing descriptors for the second DMA queue (i.e., Desc_Q1). The addresses in the state buffer of the integrated circuit may also be generated by the compiler at compile time.

Referring to Table B 220, the descriptors for the second DMA queue (i.e., Desc_Q1) may include instructions to copy data from addresses (e.g., &GATHER_TABLE[1]) in the data table stored in DRAM 110 to addresses (e.g., &GATHER_RESP[1]) in the state buffer 130. As shown in Table B 220 each of the descriptors will always copy a constant DRAM location (i.e., &GATHER_TABLE[1]) as a response.

Figure 3:
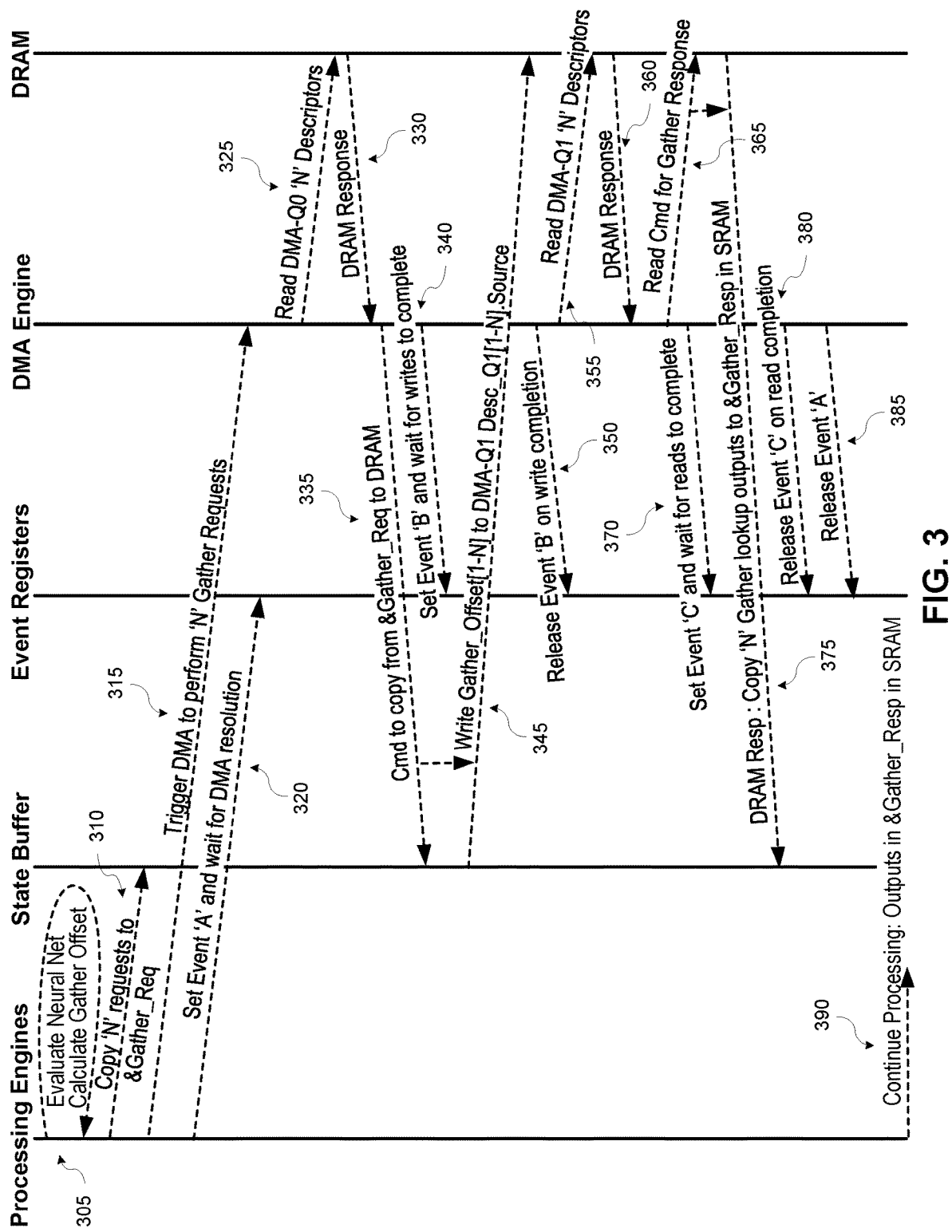
FIG. 3 is a sequence diagram illustrating a sequence of operations for performing a process for indirect addressing according to aspects of the present disclosure.

FIG. 3 is a sequence diagram illustrating a sequence of operations for performing a process for indirect addressing according to aspects of the present disclosure. Referring to FIG. 3, at operation 305, a processing engine (e.g., the processing engine 140) in the integrated circuit device 120 may perform processing operations to generate address offsets (i.e., table indices). The address offsets may be offsets from a base address of a data table, for example, a gather table stored in the host system memory (e.g., the DRAM 110), from which data is to be read.

For example, the processing engine may evaluate a neural network and determine 'k' dimensional indices of a gather_nd operator, where 'k' is a compile time constant. The indices may be referred to as "Gather_Req" herein. The outcome of executing the gather_nd operator is to fetch a fixed size data from a Gather_Table stored in DRAM at location &GATHER_TABLE, indexed by Gather_Req. The amount of data to fetch is also a compile time constant, referenced as Gather_Size. In some implementations, an application may batch these operations in parallel, to take advantage of the parallelism in the system and thereby improve efficiency.

At operation 310, the processing engine may store the address offsets in the state buffer (e.g., the state buffer 130 or other on-chip memory) in the integrated circuit device 120. The address offsets generated by the processing engine may be stored in memory locations determined by the compiler at compile time. In some implementations, the address offsets may be stored in the memory locations determined by the compiler using DMA instructions.

At operation 315, the processing engine may trigger a DMA engine (e.g., the DMA engine 150) to initiate the indirect addressing method for the data table, and at operation 320 the processing engine may set a first event (i.e., Event 'A') in the event registers 160. Setting the event may cause the processing engine to stall processing the current process thread until completion of the data table access. In various examples, event registers are a type of memory location in the integrated circuit device that can be written to by the execution units of the integrated circuit device, and, in some cases, also be written to be devices outside of the integrated circuit device.

The integrated circuit device 120 can implement events using hardware registers, for example, the event registers 160. In the example implementation of FIG. 3, the event registers 160 are illustrated as being included in the integrated circuit device 120. In some implementations, the event registers may be external to the integrated circuit device 120. In the example event registers, an event is set when, for example, a register contains a value of "1" and is not set when the register contains a value of "0." Alternatively, an event may be set when a register contains a value of "0" and is not set when the register contains a value of "1." The integrated circuit device 120 can implement instructions that wait on a value to be written to a particular event register. When the value is written, the event is considered to have occurred. Instructions that wait on an event can cause an execution unit to halt or stall further execution of a process thread until the event occurs.

At operations 325 and 330, the DMA engine may read a set of descriptors from DRAM, for example the descriptors for Table A as shown in FIG. 2, and load the set of descriptors into a first DMA queue (i.e., DMA queue Q0) of the DMA engine 150. At operation 335, the DMA engine 150 may execute the descriptors in the first DMA queue (i.e., the descriptors in Table A 210) to copy the data table address offsets (i.e., the data table indices) from the memory locations (i.e., &GATHER_REQ[1]-&GATHER_REQ[N]) in the state buffer 130 to the memory locations in DRAM containing a different set of descriptors for the second DMA queue (i.e., the descriptors in Table B 220) of the DMA engine 150. In doing so, each of the descriptors in the set of descriptors for the second DMA queue are modified from their original values. Specifically, the source address of each descriptor in Table B 220 is changed from the base address of the data table to the data table address offsets corresponding to address offsets stored in the state buffer 130. Writing the data table address offsets to the set of descriptors for the second DMA queue in DRAM maintains the base address of the data table while overwriting a portion of the field indicating the offset as shown in Table C 230 in FIG. 2. This enables the DMA engine 150 to access the data table at the memory addresses determined by the processing engine. In some implementations, the overwriting may be accomplished using hardware byte-enables.

At operation 340, the DMA engine 150 may set a second event (i.e., Event 'B'), for example by writing a value of '1' to the event register for Event 'B', to wait for completion of the operation (i.e., operation 345) of writing the data table address offsets to the set of descriptors for the second DMA queue (i.e., the descriptors in Table B 220) in DRAM. Writing the data table address offsets to the set of descriptors for the second DMA queue (i.e., the descriptors in Table B 220) may generate a modified set of descriptors for the second DMA queue (i.e., the descriptors in Table C 230).

After completion of the write operation (operation 345), at operation 350, the DMA engine 150 may release the second event (i.e., Event 'B'), for example by writing a value of '0' to the event register for Event 'B', and continue executing descriptors. At operations 355 and 360, the DMA engine 150 may read the set of descriptors for the second DMA queue from DRAM, for example the descriptors for Table C 230 as shown in FIG. 2, that have been modified by execution of the first set of descriptors, and load the set of descriptors (i.e., the descriptors in Table C 230) into the second DMA queue (i.e., DMA queue Q1) of the DMA engine 150.

At operation 365, the DMA engine 150 may execute the descriptors in the second DMA queue (i.e., the descriptors in Table C 230) to copy data indexed from the data table address offsets (i.e., the data table indices) from the memory locations (i.e., &GATHER_TABLE[&GATHER_REQ[1]]-&GATHER_TABLE[&GATHER_REQ[N]]) in DRAM. At operation 370, the DMA engine 150 may set a third event (i.e., Event 'C'), for example by writing a value of '1' to the event register for Event 'C', to wait for completion of the operation (i.e., operation 375) of copying the data from DRAM to the state buffer 130 at the memory locations (i.e., &GATHER_RESP[1]-&GATHER_RESP[N]) determined by the compiler at compile time.

After completion of the copy operation (operation 375), at operations 380 and 385 the DMA engine may release the third event (i.e., Event 'C') and the first event (i.e., Event 'A'), for example by writing values of '0' to the event registers for Event 'B' and Event 'A'. At operation 390, the processing engine may resume processing the stalled process thread using the data copied from the data table to the state buffer.

In some implementations, the first DMA queue (i.e., DMA queue Q0) and the second DMA queue (i.e., DMA queue Q1) may be associated with different DMA engines. In those implementations, the second event (i.e., Event 'B') set at operation 340 may be set by the DMA engine associated with DMA queue Q0 and released at operation 350 by the DMA engine associated with DMA queue Q0 after overwriting of the data table address offsets to the second set of descriptors for the second DMA queue in DRAM is complete. Similarly, the third event (i.e., Event 'C') may be set at operation 370 by the DMA engine associated with DMA queue Q1, and the DMA engine associated with DMA queue Q1 may release the third event (i.e., Event 'C') at operation 380 and the first event (i.e., Event 'A') at operation 385 after completion of the operation of copying the data from DRAM to the state buffer 130.

In some implementations, the first DMA queue (i.e., DMA queue Q0) and the second DMA queue (i.e., DMA queue Q1) may be associated with the same DMA engine. In those implementations, inclusion of the second event (i.e., Event 'B' set at operation 340) and the third event (i.e., Event 'C' set at operation 370) may be optional since the one DMA engine will sequentially execute the descriptors in the first DMA queue (i.e., DMA queue Q0) and the second DMA queue (i.e., DMA queue Q1).

One of ordinary skill in the art will appreciate that while events are described as a synchronization mechanism for performing the method, other implementations may use other synchronization methods, for example, but not limited to, semaphores, barriers, etc., without departing from the scope of the present disclosure.

While some operations are described herein with respect to a neural network processor, one of ordinary skill in the art will appreciate that this is merely exemplary for purposes of explanation and that the method may be performed with other table lookup operations without departing from the scope of the present disclosure.

Figure 4:
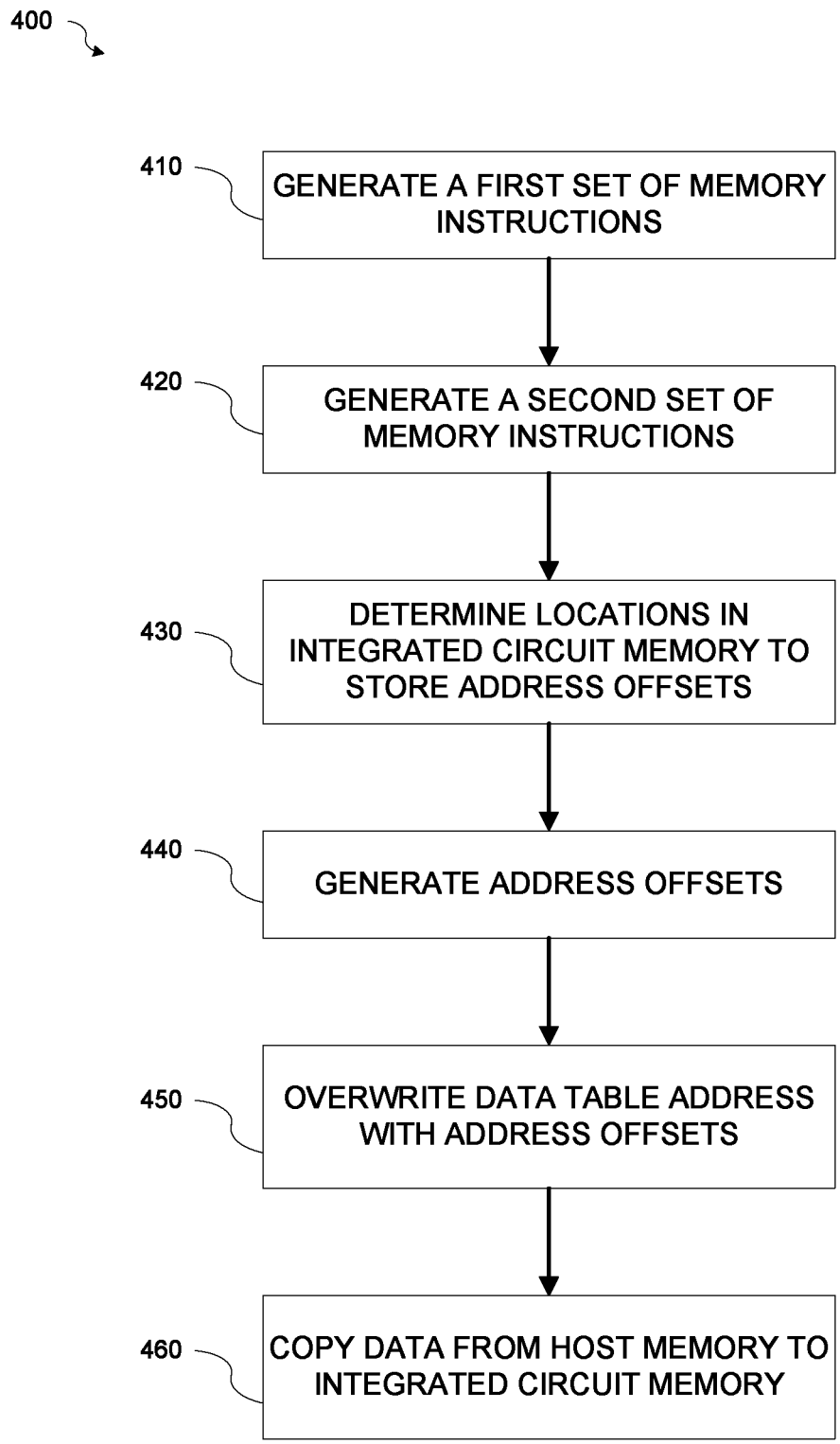
FIG. 4 is a flowchart illustrating an example of a process for indirect addressing of a data table by an integrated circuit device according to aspects of the present disclosure.

FIG. 4 is a flowchart illustrating an example of a process 400 for indirect addressing of a data table by an integrated circuit device according to aspects of the present disclosure. These methods may be implemented by the systems described above, such as for example an integrated circuit including the hardware configuration illustrated in FIG. 1 in combination with a host computing device having a processor and a memory storing instructions for executing one or more steps of the method. Referring to FIG. 4, at operation 410, a first set of memory instructions may be generated. The compiler may generate a first set of memory instructions, each memory instruction of the first set of memory instructions operable to read data at a memory address of a data table stored in host memory and copy the data to a target location in a memory of the integrated circuit. The compiler may determine the locations in host memory or other off-chip memory to store the first set of memory instructions. The host memory may be, for example, DRAM or another suitable type of memory. In some implementations, the integrated circuit may be a neural network processor and the data table may be a lookup table for a gather_nd operator. The data table may be a data matrix operated on by the neural network.

At operation 420, the compiler may generate a second set of memory instructions, each memory instruction of the second set of memory instructions operable to modify the memory instructions of the first set of memory instructions. The second set of memory instructions may modify the first set of memory instructions by overwriting a portion of the memory address of the data table in each memory instruction of the first set of memory instructions. In some implementations, the compiler may determine the locations in host memory or other off-chip memory to store the second set of memory instructions. In some implementations, the compiler may communicate to a driver program that locations in host memory or other off-chip memory may be needed for operations performed by the integrated circuit device and the driver program may determine the memory locations to be used.

At operation 430, the compiler may determine addresses of locations in the memory of the integrated circuit where memory address offsets from the base memory address of the table will be stored. The memory address offsets may be generated by a processing engine of the integrated circuit during run time. For example, the processing engine of the integrated circuit device may evaluate a neural network and determine the memory address offsets for accessing data in the data table.

At operation 440, the processing engine may generate the memory address offsets (i.e., data table indices) indicating memory locations where data needed for further processing can be found in the data table stored in the host memory. The processing engine may store the memory address offsets in the memory of the integrated circuit at the memory locations determined by the compiler. The integrated circuit memory may be, for example, SRAM or another suitable type of memory. In some implementations, the integrated circuit may be a neural network processor and the integrated circuit memory may be a state buffer. The process thread may be stalled, for example by setting an event or by another method, until the needed data is available to the processing engine, thereby freeing up the processing engine to perform other operations.

At operation 450, data table addresses indicated in the first set of memory instructions may be overwritten by executing the second set of memory instructions. For example, the processing engine may trigger a DMA engine to execute the second set of memory instructions. Execution of the second set of memory instructions by the DMA engine may cause the second set of memory instructions to modify the first set of memory instructions. The first set of memory instructions may be modified by overwriting a portion of the memory address of the data table in each memory instruction of the first set of memory instructions with the memory address offsets generated by the processing engine. The memory address offsets may be read from the memory locations in the integrated circuit memory determined by the compiler.

At operation 460, data may be copied from the host memory to integrated circuit memory. For example, completion of the second set of memory instructions may trigger execution of the first set of memory instructions. The first set of memory instructions may cause data to be copied from locations in data table in host memory indicated by the memory address offsets to integrated circuit memory. When the data is available to the processing engine, the event or other mechanism may be released enabling the processing engine to resume the process thread.

The first set of memory instructions may be associated with a first DMA queue and the second set of memory instructions may be associated with a second DMA queue. In some implementations, the first DMA queue and the second DMA queue may be associated with the same DMA engine. In other implementations, the first DMA queue and the second DMA queue may be associated with different DMA engines. In cases where different DMA engines are associated with the queues, events may be used to synchronize execution of the first and second sets of memory instructions.

It should be appreciated that the specific operations illustrated in FIG. 4 provide a particular method for indirect addressing of a data table according to an embodiment. Other sequences of operations may also be performed according to alternative embodiments. For example, alternative embodiments may perform the operations outlined above in a different order. Moreover, the individual operations illustrated in FIG. 4 may include multiple sub-operations that may be performed in various sequences as appropriate to the individual operations. Furthermore, additional operations may be added or removed depending on the particular applications. One of ordinary skill in the art would recognize many variations, modifications, and alternatives.

Figure 5:
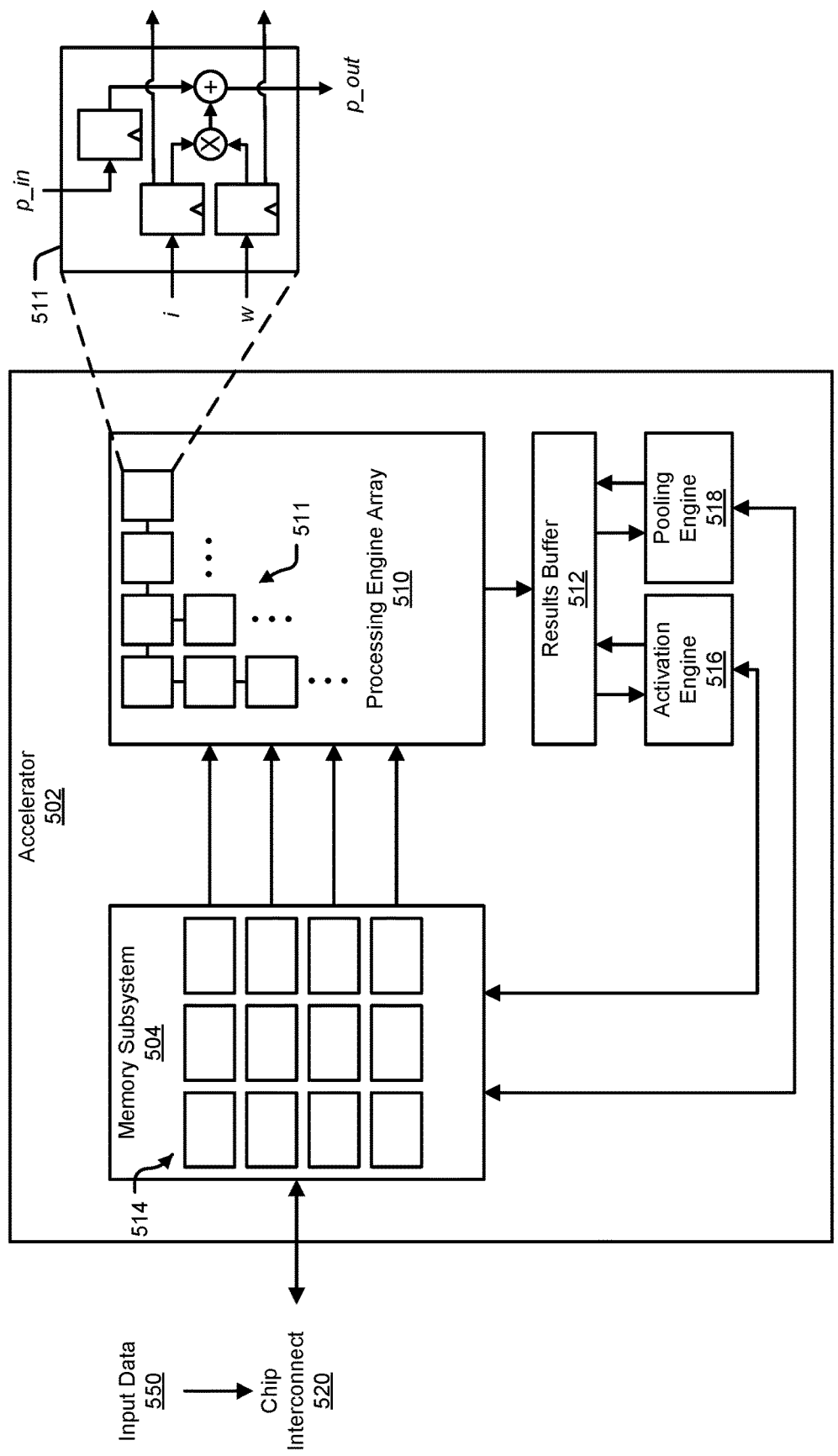
FIG. 5 is a block diagram illustrating an example of an integrated circuit device.

FIG. 5 is a block diagram illustrating an example of an integrated circuit device that can implement the DMA assisted indirect memory addressing method of the present disclosure. The example of FIG. 5 illustrates an accelerator 502. In various examples, the accelerator 502, for a set of input data (e.g., input data 550), can execute computations using a processing engine array 510, an activation engine 516, and/or a pooling engine 518. In some examples, the example accelerator 502 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time.

Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hard wired to receive values from columns of the processing engine array 510, with one memory bank receiving data for each column.

The processing engine array 510 is the computation matrix of the example accelerator 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514, can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 502.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
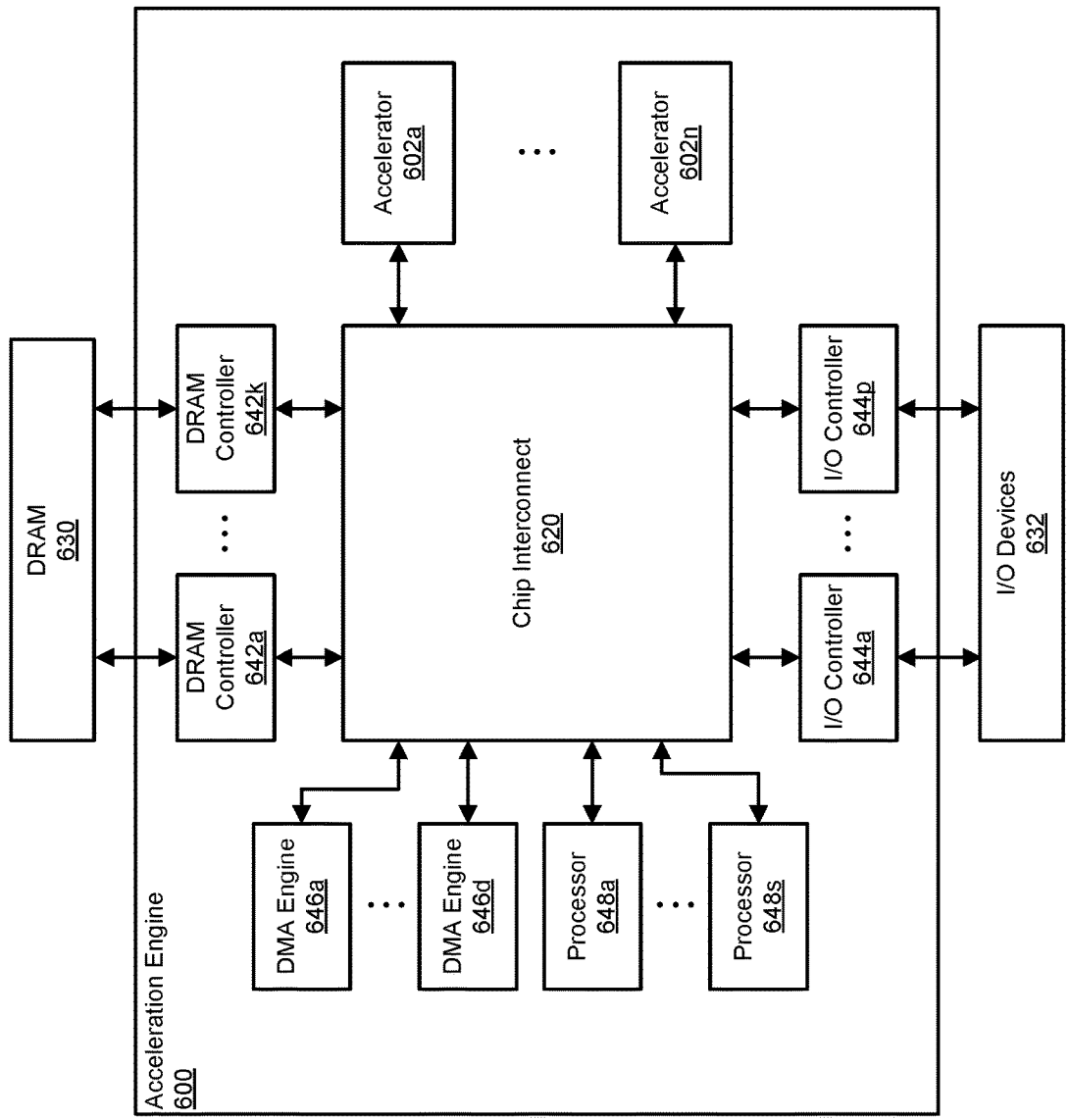
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602n that may be similar to the accelerator illustrated in FIG. 5.

In the example of FIG. 6, the acceleration engine 600 includes multiple accelerators 602a-602n, each of which can perform a set of operations. In various examples, the accelerators 602a-602n are for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of them is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI), can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
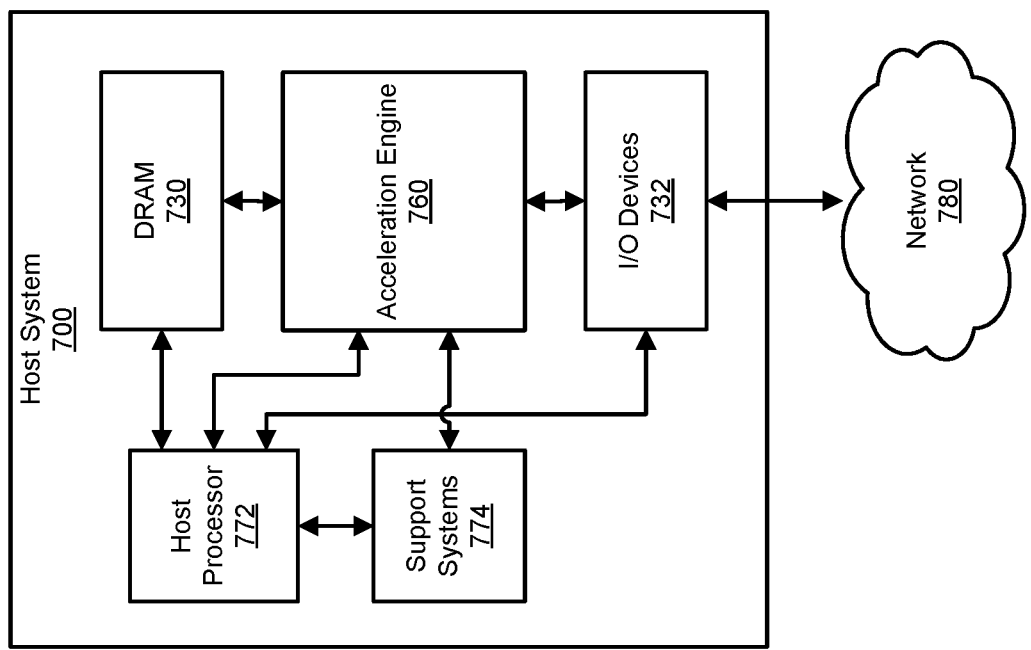
FIG. 7 includes a block diagram that illustrates an example of a host system.

FIG. 7 includes a block diagram that illustrates an example of a host system 700 in which an acceleration engine 760 can be used. The acceleration engine 760 of FIG. 7 is an example of a device that can include one or more accelerators such as are illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on-chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
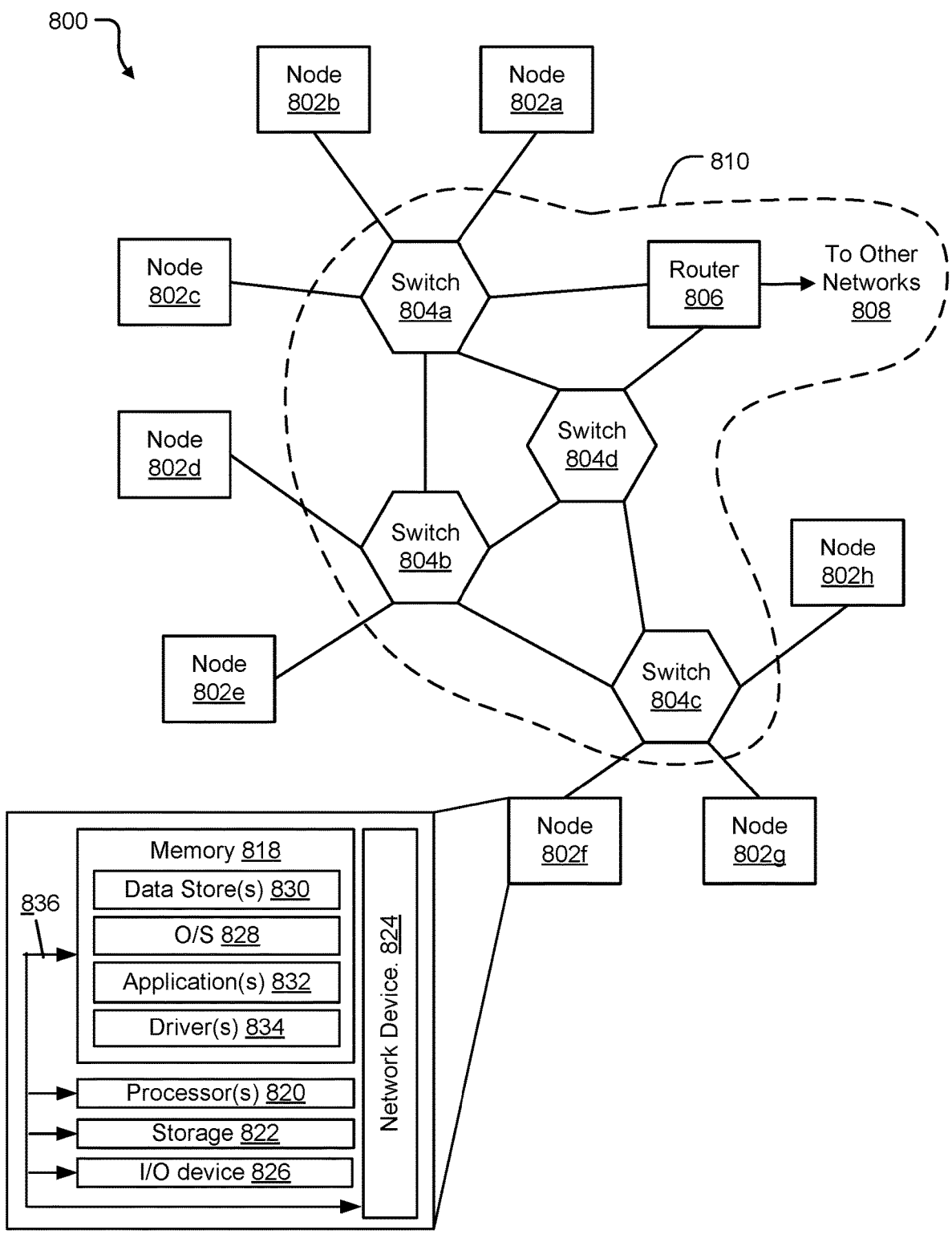
FIG. 8 includes a diagram of an example network.

FIG. 8 includes a diagram of an example network 800, which can include one or more host systems, such as the host system illustrated in FIG. 7. For example, the example network 800 of FIG. 8 includes multiple nodes 802a-802h, one or more of which can be a host system such as is illustrated in FIG. 7. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support basic functions of nodes 802a-802h, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for indirect addressing of a data table by an integrated circuit (IC) device, the method comprising:
   generating, by a compiler, a first set of memory instructions, each memory instruction of the first set of memory instructions operable to cause the IC device to read data at a memory address of the data table stored in a host computer system memory, the memory address to be determined during execution of a program by the IC device, and to copy the data to a target location;
   generating, by the compiler, a second set of memory instructions, each memory instruction of the second set of memory instructions operable to cause the IC device to overwrite a portion of the memory address of the data table for each of the first set of memory instructions;
   storing, by a driver program, the first set of memory instructions and the second set of memory instructions in a first set of locations in the host computer system memory, wherein the first set of locations is determined by the compiler;
   generating, by a first execution engine of the IC device, a set of memory address offsets from a base memory address of the data table for accessing data in the data table at the set of memory address offsets, wherein the first execution engine stores the set of memory address offsets in a second set of locations of an on-chip memory of the IC device; and
   executing, by a direct memory access (DMA) engine of the IC device, the second set of memory instructions, the second set of memory instructions operable to cause the IC device to copy the set of memory address offsets from the on-chip memory of the IC device to the first set of locations in the host computer system memory containing the first set of memory instructions, wherein the set of memory address offsets overwrites, for each of the first set of memory instructions, the portion of the memory address of the data table with an offset from the base memory address of the data table.

2. The method for indirect addressing of claim 1, wherein the host computer system memory is a dynamic random access memory (DRAM).

3. The method for indirect addressing of claim 1, wherein the second set of locations in the on-chip memory of the IC device is determined by the compiler.

4. The method for indirect addressing of claim 1, wherein the on-chip memory is a state buffer of the integrated circuit device.

5. A computer-implemented method, comprising:
storing, in a first memory, a first set of memory instructions, each memory instruction of the first set of memory instructions operable to read data from a memory address of a data table;
storing, in the first memory, a second set of memory instructions, each memory instruction of the second set of memory instructions operable to write one of a set of memory address offsets to each of the first set of memory instructions;
generating, by a first execution engine, the set of memory address offsets for accessing the data in the data table at the set of memory address offsets, the set of memory address offsets being offsets from a base memory address of the data table;
storing, by the first execution engine, the set of memory address offsets in a second memory; and
executing, by a second execution engine, the second set of memory instructions, the second set of memory instructions operable to overwrite a portion of the memory address in each of the first set of memory instructions with a memory address offset from the set of memory address offsets.

6. The computer-implemented method of claim 5, further comprising:
executing, by the second execution engine, the first set of memory instructions to copy data from memory locations of the data table indicated by the set of memory address offsets to the second memory.

7. The computer-implemented method of claim 5, further comprising:
determining, by a compiler, a first set of memory locations in the first memory for storing the first set of memory instructions and the second set of memory instructions, wherein the first set of memory instructions and the second set of memory instructions are generated by the compiler.

8. The computer-implemented method of claim 5, further comprising:
determining, by a compiler, a second set of memory locations in the second memory for storing the set of memory address offsets generated by the first execution engine.

9. The computer-implemented method of claim 5, wherein the first memory is a memory of a host computer system.

10. The computer-implemented method of claim 5, wherein the first execution engine and the second execution engine comprise an integrated circuit device, and
the second memory comprises a memory of the integrated circuit device.

11. The computer-implemented method of claim 10, wherein the integrated circuit device is a neural network processor, and
the data table is a lookup table for obtaining a subset of values from a matrix of values.

12. The computer-implemented method of claim 11, wherein the second memory is a state buffer of the neural network processor.

13. The computer-implemented method of claim 5, wherein execution of the first set of memory instructions modifies the second set of memory instructions.

14. The computer-implemented method of claim 5, wherein the second execution engine is a direct memory access (DMA) engine, the first set of memory instructions is associated with a first DMA queue of the DMA engine, and the second set of memory instructions is associated with a second DMA queue of the DMA engine.

15. The computer-implemented method of claim 5, wherein the second execution engine is a first direct memory access (DMA) engine, the first set of memory instructions is associated with a DMA queue of the first DMA engine, and the second set of memory instructions is associated with a DMA queue of a second DMA engine.

16. An integrated circuit device, comprising:
a first execution engine operable to generate a set of memory address offsets from a base memory address of a data table, the data table containing data for processing by the first execution engine;
a memory configured to store the set of memory address offsets at locations in the memory, the locations determined by a compiler at compile time; and
a second execution engine operable to:
modify a first set of memory instructions by executing a second set of memory instructions, the second set of memory instructions operable to read the set of memory address offsets from the memory, wherein the first set of memory instructions is modified with the set of memory address offsets; and
execute the first set of memory instructions, the first set of memory instructions operable to copy data from memory locations of the data table indicated by the set of memory address offsets to the memory, wherein the data table is stored in a host system memory.

17. The integrated circuit device of claim 16, wherein the second set of memory instructions is operable to modify the first set of memory instructions by overwriting a portion of a memory address of the data table in each of the first set of memory instructions with a memory address offset from the set of memory address offsets.

18. The integrated circuit device of claim 16, wherein the second execution engine is a direct memory access (DMA) engine operable to execute the first set of memory instructions from a first DMA queue and execute the second set of memory instructions from a second DMA queue.

19. The integrated circuit device of claim 18, wherein the first DMA queue and the second DMA queue are stored in the host system memory at addresses determined by the compiler at compile time.

20. The integrated circuit device of claim 16, wherein the integrated circuit device is a neural network processor, and
the data table is a lookup table for a gather_nd operator.

21. A non-transitory computer readable medium having stored therein instructions that, when executed by one or more processors cause the one or more processors to execute a compiler, the compiler performing operations including:
generating a first set of memory instructions operable to read data at memory addresses of a data table stored in a host computer system memory, the memory addresses of the data table to be determined during execution of a program, and to copy the data to target locations;

generating a second set of memory instructions operable to overwrite a portion of the memory addresses of the data table in the first set of memory instructions, the overwriting based on the memory addresses determined during execution of the program; and generating a set of memory addresses for a memory of an integrated circuit device, the memory of the integrated circuit device operable to store the memory addresses to be determined during execution of the program.

\* \* \* \* \*